United States Patent
Haboush, II

(10) Patent No.: US 6,289,945 B1
(45) Date of Patent: Sep. 18, 2001

(54) FUEL FILL ASSEMBLY WITH VENT PASSAGE

(75) Inventor: William P Haboush, II, Highland, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/680,196

(22) Filed: Oct. 6, 2000

(51) Int. Cl.$^7$ .................................................. B65B 31/00
(52) U.S. Cl. ............................. 141/59; 141/285; 141/297; 141/300; 141/311 A; 220/86.2
(58) Field of Search .................... 141/59, 192, 197, 141/198, 285, 297, 300, 363, 366, 382, 311 A; 220/86.2, DIG. 33; 137/587–589

(56) References Cited

U.S. PATENT DOCUMENTS

| | | | |
|---|---|---|---|
| 4,759,458 | * 7/1988 | Fischer | 220/86 R |
| 4,881,578 | 11/1989 | Rich et al. | 141/44 |
| 5,282,497 | 2/1994 | Allison | 141/59 |
| 5,363,705 | 11/1994 | Nakao et al. | 73/861.22 |
| 5,673,738 | 10/1997 | Spaulding | 141/392 |
| 5,960,833 | 10/1999 | Der Manuelian | 138/112 |
| 6,000,426 | 12/1999 | Tuckey et al. | 137/588 |
| 6,026,853 | 2/2000 | Osterbrink | 137/527.4 |
| 6,065,507 | 5/2000 | Nanaji | 141/59 |
| 6,172,332 | * 1/2001 | Tinkner et al. | 219/133 |

* cited by examiner

*Primary Examiner*—Timothy L. Maust
(74) *Attorney, Agent, or Firm*—Laura C. Hargitt

(57) ABSTRACT

A fuel fill pipe assembly for promoting less turbulent flow in a fuel pipe is disclosed. The assembly includes a pipe extending between a first end to a second end wherein said pipe is suitable for receiving a fuel dispensing nozzle. The pipe includes a vent passage positioned on the pipe for providing space for fuel that is entering or has entered the pipe or is leaving the nozzle that is dispensing the fuel.

13 Claims, 3 Drawing Sheets

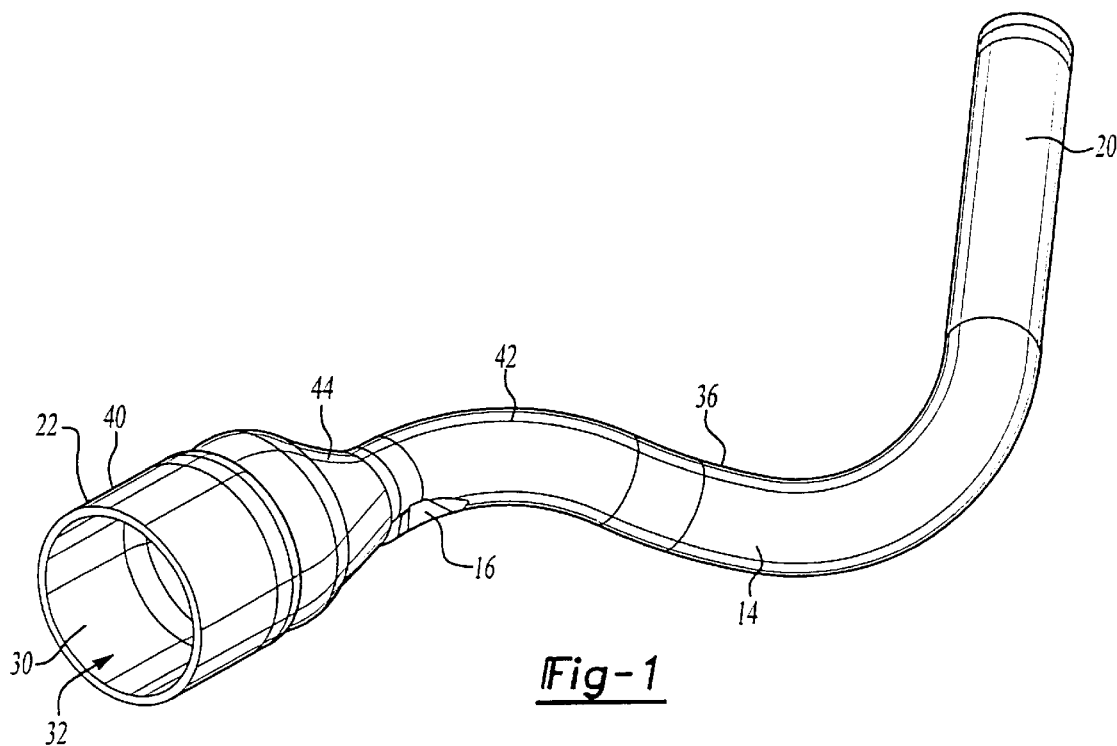
Fig-1
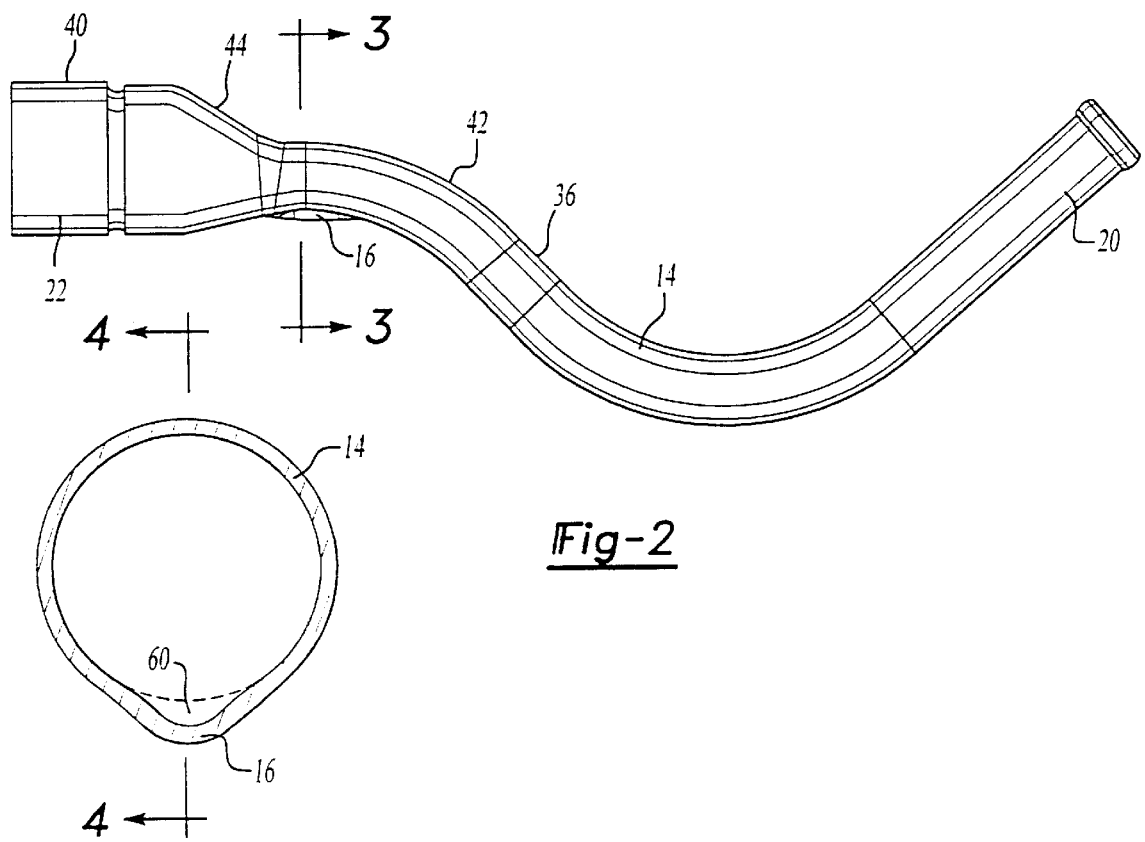
Fig-2
Fig-3

FUEL FILL ASSEMBLY WITH VENT PASSAGE

FIELD OF THE INVENTION

The present invention relates to a fuel fill pipe assembly, which includes a pipe that extends from a fuel tank or other fuel reservoir to a fill pipe access area or location. More particularly, the present invention relates to a fuel fill pipe assembly, which includes a fuel fill pipe for an automotive vehicle wherein the pipe includes a vent passage, which may align with an aerator hole of a fuel fill nozzle.

BACKGROUND OF THE INVENTION

A great many tanks or other reservoirs which contain and/or store fuel include a fuel fill pipe which extends outwardly from the tank or reservoir to a location where fuel may be dispensed in the fill pipe and flow to the tank or reservoir. For example, and without limitation, automotive vehicles typically include a fuel fill pipe which extends from a gasoline tank of the vehicle to another portion or location of the vehicle where fuel (e.g., gasoline) may be dispensed or pumped into the fill pipe and flow to the gasoline tank. It is generally desirable for fuel to be dispensed in these fill pipes such that the fuel flow into and through the pipe is relatively laminar or smooth as opposed to turbulent because turbulent flow can cause vapor from the fuel to be released into the environment and turbulent flow can be slow and can undesirably increase the time required to dispense the fuel.

Furthermore, slow or turbulent fuel flow can cause additional problems for automotive vehicles. For example, and without limitation, fuel may be dispensed to automotive vehicle fill pipes or other fill pipes with a nozzle having an automatic "shut off" feature. Preferably, the automatic "shut off" is triggered when the gasoline tank of the vehicle or other reservoir is full and fuel begins to gather in the fill pipe and the fuel covers or contacts or otherwise affects an aerator hole or shutoff port of the nozzle. However, if the fuel that flows into the fill pipe is turbulent, the fuel being dispensed may flow too slowly and may gather in the pipe prematurely or may splash back upon the shutoff port and trigger the automatic shut off feature prematurely or before the tank or reservoir is full.

Therefore, it is desirable to provide a fuel fill pipe, which assists in minimizing the turbulence experienced when fuel is dispensed in the pipe and/or helps minimize the potential of premature shutoffs of a fuel dispensing nozzle.

SUMMARY OF THE INVENTION

According to a first aspect of the present invention, there is disclosed a fuel fill pipe assembly. The assembly includes a pipe extending from a reservoir suitable for supporting fuel, the pipe being suitable for receiving fuel, and a vent passage structure defining a vent passage, the vent passage structure positioned on the pipe for minimizing splash back of the fuel as the fuel enters the pipe from a fuel nozzle.

According to a second aspect of the invention, there is disclosed a fuel fill pipe assembly for an automotive vehicle. The assembly includes a pipe extending along a length of the pipe between a proximate end and a distal end, the proximate end suitably attached to a fuel tank of the vehicle, the distal end suitable for receiving a fuel nozzle for dispensing fuel, the pipe having a radius wherein the pipe includes a vent passage structure within the pipe, the vent passage structure positioned at a lower area of the pipe radius for aligning with an aerator hole of the fuel nozzle.

These and other objects, aspects, and advantages of the present invention will become apparent upon reading the following detailed description in combination with the accompanying drawings.

BRIEF DESCRIPTION OF THE DRAWINGS

FIG. 1 illustrates a perspective view of a fuel fill pipe according to an aspect of the present invention.

FIG. 2 illustrates a side view of the fuel fill pipe shown in FIG. 1.

FIG. 3 illustrates a sectional view of the fuel fill pipe shown in FIGS. 1 and 2 taken along line 3—3.

DETAILED DESCRIPTION OF PREFERRED EMBODIMENTS

Figure 5:
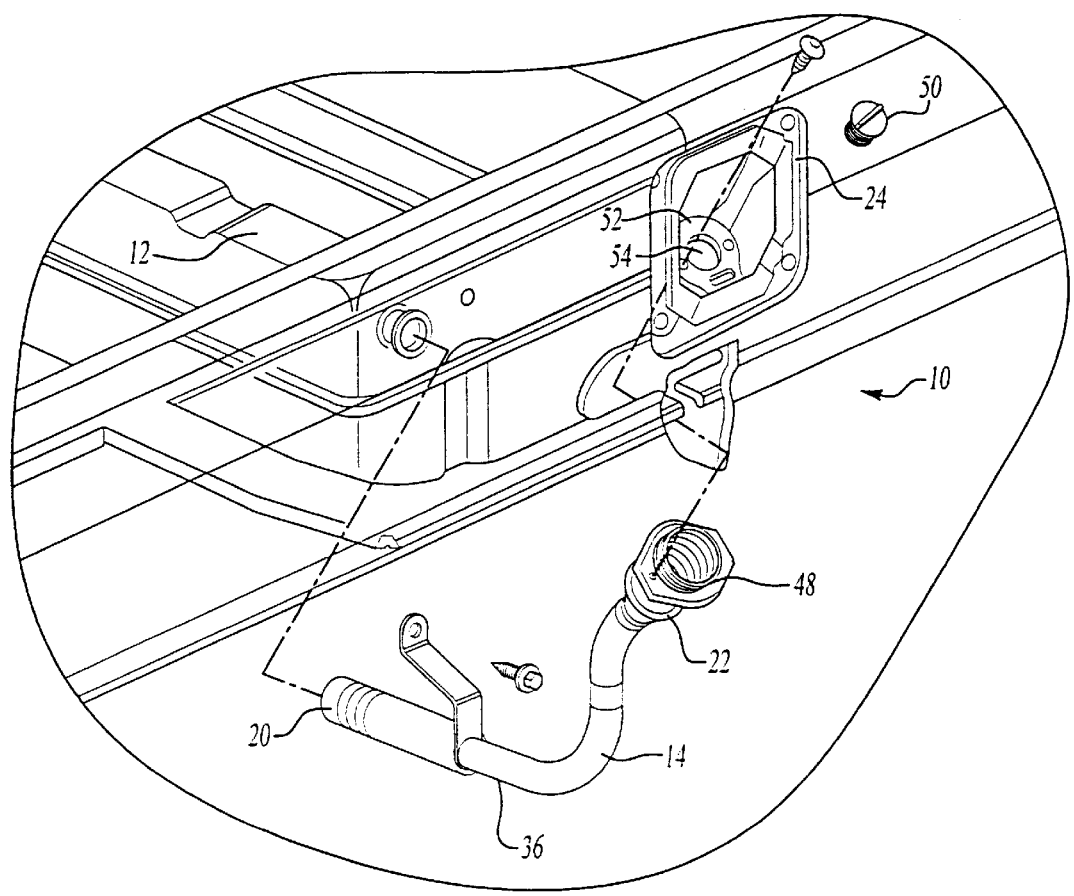
FIG. 5 illustrates a fuel fill pipe assembly that includes the fuel fill pipe of FIGS. 1 through 4.

Referring now to FIGS. 1 and 5, there is illustrated a fuel fill pipe assembly 10 which is used to receive fuel that flows from a fuel dispensing or receiving area to a reservoir or tank for storing, supporting or containing the fuel. One of skill in the art will appreciate that the fuel fill pipe assembly 10 can be used to receive fuel for a gasoline tank 12 of an automotive vehicle. However, one of skill in the art will also appreciate that the fuel fill pipe assembly 10 or variations of the fuel fill pipe assembly 10 can be used in a variety of applications other than automotive vehicles. For instance, the fuel fill pipe assembly 10 or slight variations of the fuel fill pipe assembly 10 may also be used for reservoirs such as boat fuel tanks or other fuel tanks or reservoirs which have fill pipes. For illustrative purposes, however, the non-limiting embodiment of the fuel fill pipe assembly 10 that is shown in FIGS. 1 and 5 is for use in an automotive vehicle wherein the assembly 10 includes a conventional fuel tank or reservoir 12, a fuel fill pipe 14 and a vent passage structure 16 which is attached or integrated into the pipe 14.

Figure 4:
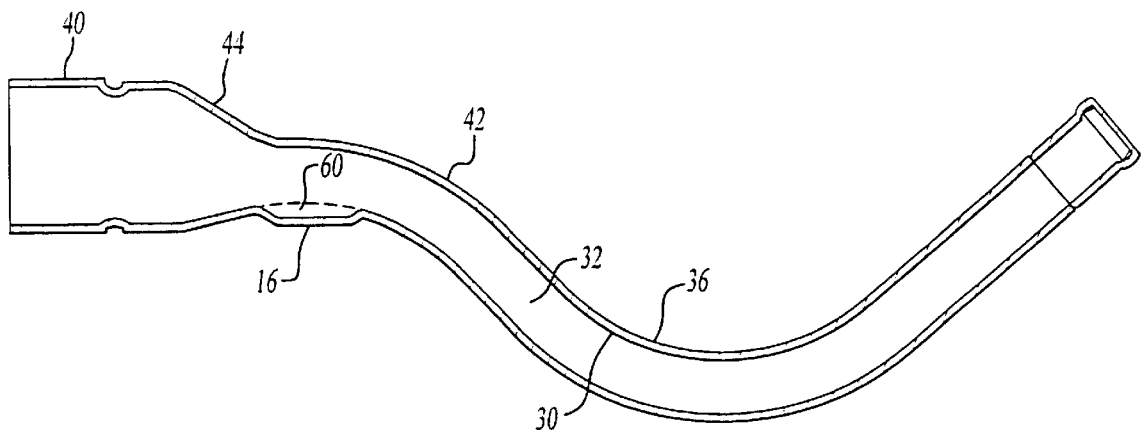
FIG. 4 illustrates a sectional view of the fuel fill pipe shown in FIGS. 1, 2, and 3 taken along line 4—4.

Referring now to FIGS. 1, 4 and 5, the fuel fill pipe 14 is elongated with a length that extends between a proximate end 20 located near the fuel tank 12 and a distal end 22 near a fill pipe access area. In the embodiment shown, the pipe 14 includes a cylindrical inner surface 30, which defines an annular hole, opening or passageway 32 that extends along the elongation or length of the pipe 14. The pipe 14 also includes an outer surface 36 that extends along the elongation or length of the pipe 14.

In a non-limiting embodiment of the invention, the distal end 22 of the pipe 14 includes a first generally cylindrical portion 40 having a first inner diameter, a second generally cylindrical portion 42 having a second inner diameter and a generally frusto-conical portion 44 disposed between the first and second cylindrical portions 40, 42. In the embodiment shown, the first diameter of the first cylindrical portion 40 is greater than the second diameter of the second cylindrical portion 42. Preferably, the inner diameter of the second cylindrical portion 47 is relatively small (e.g., less than 1.3 inches or approximately 1.0 inch).

It shall be recognized that, in alternative embodiments of the invention, the fill pipe may be formed in a variety of configurations of varying size and/or shape. For example, the pipe may be generally square, elliptical, triangular, polygonal or other combination of shapes and/or curves along the length or elongation of the pipe. Furthermore, the pipe may vary in size along its length or may vary in length.

Figure 6:
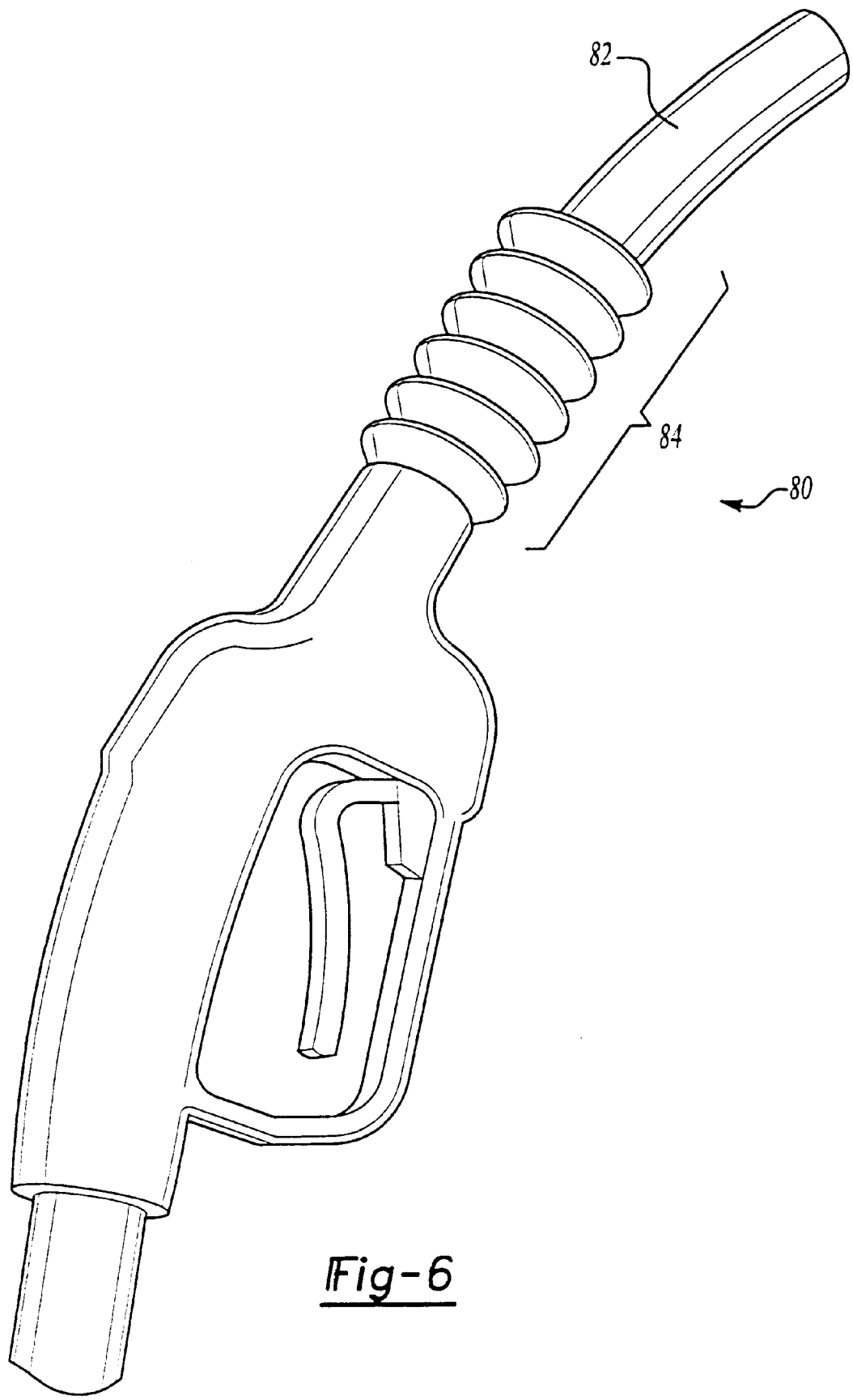
FIG. 6 illustrates a perspective view of a conventional dispensing nozzle that may be used to dispense fuel to the fill pipe assemblies of FIG. 5.

In a non-limiting embodiment, the first cylindrical portion 40 of the distal end 22 may be attached to a member 24 of an automotive vehicle such that the member 24 and/or the cylindrical portion 40 can cooperatively receive a conventional fuel nozzle such as the nozzle 80 shown in FIG. 6. Further, a conventional closure device 50 (i.e., a gas cap) 50 may be used to selectively provide access to the first cylindrical portion 40 or generally the passageway 32 of the pipe 14.

The person of skill in the art will recognize that a variety of closure devices may be used in conjunction with the fill pipe assembly or for certain pipes, a closure device may be integrally attached to the member 24 or may be unneeded. Furthermore, the skilled artisan will recognize that the first cylindrical portion 40, the cap 50, and the member 24 may be altered in shape or size or otherwise without departing from the scope of the present invention.

In a further non-limiting embodiment of the invention, the distal end 22 of the pipe 14 or the member 24 may include a guide member 52, which extends generally perpendicular to the larger cylindrical portion 40. In the embodiment shown, the guide member 52 is annularly shaped and includes a fuel access opening 54 in the center of the guide member 52. The opening 54 provides access to the fuel pipe 14 such that an individual or machine may dispense fuel into the pipe 14 and, therefore, into the reservoir or tank 12 by directing fuel through the opening 54. The opening 54 may be sized to receive a conventional fuel nozzle or the opening 54 may receive the pipe 14 such that the conventional nozzle may be directly inserted into the pipe 14. A conventional nozzle 80 for automotive vehicles is shown in FIG. 6 and the nozzle includes a conventional elongated dispensing portion 82 which may be directed through the opening 54 to dispense (i.e., pump) gasoline into the fuel pipe 14 and the receptacle 12.

The person of skill in the art will recognize that member 24 the guide portion 52 and other components of the distal end 22 of the fuel fill pipe 14 may be formed in a variety of configurations without departing from the scope of the present invention.

Referring to FIGS. 1–4, the fuel fill pipe assembly 10 or fill pipe 14 also includes a vent passage structure 16 positioned within the fill pipe 14. The vent passage structure 16 may be a bend, a well, a dent or other structure which provides additional space to the passageway 32 of the pipe 14. In the non-limiting embodiment shown, the vent passage 16 is concave with respect to the passageway 32 of the pipe 14 and extends outwardly from the passageway 32 of the pipe 14. Furthermore, a portion of the passage structure 16 is defined by the outer surface 42 of the pipe 14 and the portion is generally convex with respect to the area outside of the pipe 14. The passage structure 16 is generally angular and/or arcuate in cross section and resides in the lower radius of the smaller diameter portion 42 of the fill pipe 14. In the embodiment shown, the passage 16 defines an open area or passage 60 in the smaller diameter portion 42 of fuel pipe 14 near the frusto-conical portion 44 of the pipe 14 and the passage 60 of the passage structure 16 gets progressively smaller as the passage structure 16 extends down the elongation of the pipe 14 toward the proximate end 20 until the smaller diameter portion is substantially cylindrical. In alternative embodiments of the invention, the passage structure 16 may be in different shapes such as arcuate or otherwise, and may vary or maintain a constant size along the length of the pipe.

In other alternative embodiments, the passage structure 16 may be relatively small or relatively large and may extend very slightly away from the internal open portion of the pipe or they may extend greater distances away from the passageway 32.

In further alternative embodiments, the passage structure 16 may extend into the frusto-conical portion 44 or the larger cylindrical portion 40 of pipe. In even further alternative embodiments of the invention, the distal end 22 of the pipe may have an alternative configuration and the passage structure 16 may be positioned or placed upon areas of the alternative configurations. The passage structure 16 may be continuous or non-continuous, elongated or non-elongated and may be positioned at variable locations along the length of the pipe 14.

In the embodiment shown, the pipe 14, the passage structure 16 and the remainder of the assembly 10 are formed from a suitable metal such as steel, aluminum, iron or a combination thereof. In alternative embodiments, the pipe 14 may be formed from other metals, plastics, rubber or other suitable materials. The tank 12 is also formed of a suitable metal such as steel, aluminum, iron, a combination thereof or some other suitable material. The cap 50 may be formed of plastic metal or other suitable material.

Assembly or Formation

The fill pipe 14 may be formed or assembled in a variety of manners. In one non-limiting embodiment, the pipe 14 may be formed from a conventional cylindrical metal pipe material having a substantially uniform or non-uniform diameter. In the embodiment, the pipe 14 is formed according to conventional methods such as hydroforming, casting or other suitable forming methods. Furthermore, one or more mandrels or other forming devices may be used to enlarge, constrict or otherwise shape portions of the pipe 14 to form the large cylindrical portion 40, the frusto-conical portion 44 and the smaller cylindrical portion 42 or other desired portions. In an alternative embodiment, the fill pipe 14 may be cast, hydroformed or otherwise formed to directly form the large cylindrical portion 40, the frusto-conical portion 44 and the small cylindrical portion 42.

The passage structure 16 in the fill pipe 14 may be formed in a variety of manners as well. In one embodiment, the pipe 14 is placed upon a fixture and the passage is formed in the pipe 14 with metal forming tools. In an alternative embodiment, the passage structure 16 may be formed in the pipe by hydroforming the pipe with a die or dies that are suitably shaped to form the passage structure 16 in the pipe 14. In still another embodiment, the pipe 14 may be cast or otherwise formed with the passage structure 16.

The fill pipe 14 may be attached to the tank 12 and the member 24 in a variety of conventional manners such as the use of fasteners, welding or the like.

The person of skill in the art will recognize that a variety of manners or methods of metal or material forming may be utilized to form the pipe 14 or to place or position the passage 16 in a given pipe. The person of skill in the art shall further recognize that the manner used to form the pipe 14 and the passage structure 16 may depend on the materials used to form the pipe 14.

Operation

Referring again to FIGS. 1–4, the manner in which the assembly 10 assists in the flow of fuel to the tank will be discussed.

Generally, fuel that flows into a pipe, especially fuel that initially enters a pipe, may experience turbulent flow. In such cases, the fuel flowing into the pipe may tend to back up or build up, thereby undesirably restricting flow into and through the pipe. Smaller diameter pipes can assist in promoting more laminar flow, thereby helping to alleviate the turbulent flow problem. However, smaller diameter pipes can still experience turbulent flow near the tip of a nozzle that is dispensing fuel, and such turbulence can cause premature shut-offs of such nozzles if the turbulent fuel splashes back at the nozzle and triggers the automatic shut-off of the nozzle.

Specifically in the case of automotive vehicles, but also with other fill pipes that are designed to receive fuel, nozzles or other dispensing devices dispense, pour or otherwise place the fuel in the pipe. An example of such a nozzle is the nozzle 80 shown in FIG. 6. The nozzle 80 and many nozzles similar to it include an aerator hole or shut-off port in a region 84 of the nozzle and the region 84 is usually received within the pipe 14 such that the shut-off port faces or is exposed to a portion of the inner surface 30 of the pipe 14 that is on the lower radius of the pipe 14. Such ports generally sense or have air flow through the port stopped by fuel that advances toward or contacts the port and upon interaction with such fuel, the nozzle automatically stops pumping or dispensing fuel. It is desirable to have such automatic shut-off when the tank 12 is full, however, such automatic shut-off is undesirable prior to the tank being full. In the non-limiting embodiment shown, the opening 54 of the fill pipe 14 is designed to receive a nozzle such as the nozzle 80 of FIG. 6. The nozzle 80 may dispense fuel at, near or beyond the interface between the frusto-conical portion 44 and the smaller cylindrical portion 42 of the pipe 14. As the fuel flows into the pipe 14, the passage structure 16 provides greater space between fuel flowing from the nozzle 80 and into the smaller portion 42 of the pipe 14 thereby making fuel back up or fuel splash back toward the nozzle 80 and/or automatic shut-off less likely.

In a preferred embodiment, the vent passage structure 16 is designed to circumferentially align with the aerator hole of the nozzle 80, which triggers an automatic shut-off of the nozzle when the hole is filled with, covered by, or otherwise affected by fuel.

Additionally, in some situations, the shape and/or positioning of the vent passage structure 16 can assist fuel that is dispensed in the pipe 14 to flow in a laminar manner soon after the fuel is dispensed as opposed to having a cylindrical pipe without the passage structure 16.

It should be understood that the invention is not limited to the exact embodiment or construction, which has been illustrated and described but that various changes may be made without departing from the spirit and the scope of the invention.

What is claimed is:

1. A fuel fill pipe assembly comprising:
    a pipe extending from a reservoir suitable for supporting fuel, said pipe being suitable for receiving fuel, wherein said pipe includes a first cylindrical portion having a first diameter, a second cylindrical portion having a second diameter and a generally frusto-conical portion disposed between said first cylindrical portion and said second cylindrical portion; and
    a vent passage structure positioned on said pipe for minimizing splash back of said fuel as said fuel enters said pipe from a fuel nozzle wherein said vent passage structure is substantially located upon said second cylindrical portion, said second diameter being smaller than said first diameter.

2. A fuel fill pipe assembly as in claim 1 wherein said pipe is generally cylindrical.

3. A fuel fill pipe assembly as in claim 1 wherein said vent passage structure is formed from a portion of the pipe.

4. A fuel pipe assembly as in claim 1 wherein said vent passage structure is generally angular in cross section.

5. A fuel fill pipe assembly as in claim 1 wherein said pipe is suitable for an automotive vehicle.

6. A fuel fill pipe assembly as in claim 1, wherein at least a portion of said vent passage structure is concave with respect to a passageway within said pipe through which said fuel flows.

7. A fuel fill pipe assembly as in claim 2, wherein said vent passage structure is positioned to circumferentially align with an aerator hole of said fuel nozzle.

8. A fuel fill pipe assembly for an automotive vehicle comprising:
    a generally cylindrical pipe extending along a length of said pipe between a proximate end and a distal end, said proximate end suitably attached to a fuel tank of said vehicle, said distal end suitable for receiving a fuel nozzle for dispensing fuel, said pipe having a radius wherein said pipe includes a vent passage structure within said pipe defining a vent passage, said vent passage structure positioned entirely within a lower area of said pipe radius for circumferentially aligning with an aerator hole of said fuel nozzle.

9. A fuel fill pipe assembly as in claim 8, wherein said vent passage structure is formed from a portion of the pipe.

10. A fuel pipe assembly as in claim 8, wherein said vent passage structure is generally angular in cross section.

11. A fuel fill pipe assembly as in claim 8, wherein said pipe includes a first cylindrical portion having a first diameter, a second cylindrical portion having a second diameter and a generally frusto-conical portion disposed between said first cylindrical portion and said second cylindrical portion.

12. A fuel fill pipe assembly as in claim 11, wherein said vent passage structure is substantially located upon said second cylindrical portion, said second diameter being smaller than said first diameter.

13. A fuel fill pipe assembly as in claim 8, wherein at least a portion of said vent passage structure is concave with respect to a passageway within said pipe through which said fuel flows.

* * * * *